(12) United States Patent
McClellan

(10) Patent No.: US 7,899,610 B2
(45) Date of Patent: Mar. 1, 2011

(54) SYSTEM AND METHOD FOR RECONFIGURING AN ELECTRONIC CONTROL UNIT OF A MOTOR VEHICLE TO OPTIMIZE FUEL ECONOMY

(75) Inventor: Scott McClellan, Heber City, UT (US)

(73) Assignee: Inthinc Technology Solutions, Inc., West Valley City, UT (US)

( * ) Notice: Subject to any disclaimer, the term of this patent is extended or adjusted under 35 U.S.C. 154(b) by 264 days.

(21) Appl. No.: 11/860,594

(22) Filed: Sep. 25, 2007

(65) Prior Publication Data

US 2008/0221776 A1 Sep. 11, 2008

Related U.S. Application Data

(60) Provisional application No. 60/848,681, filed on Oct. 2, 2006.

(51) Int. Cl.
G06F 19/00 (2006.01)
F02D 41/02 (2006.01)

(52) U.S. Cl. ........................ 701/115; 701/103

(58) Field of Classification Search .............. 701/1, 701/29, 35, 100–106, 114, 115; 123/478, 123/480, 486, 494; 340/426.14; 700/180; 702/182, 183
See application file for complete search history.

(56) References Cited

U.S. PATENT DOCUMENTS

| | | | |
|---|---|---|---|
| 3,975,708 A | 8/1976 | Lusk | |
| 4,369,427 A | 1/1983 | Drebinger et al. | |
| 4,395,624 A | 7/1983 | Wartski | |
| 4,419,654 A | 12/1983 | Funk | |
| 4,458,535 A | 7/1984 | Juergens | |
| 4,785,280 A | 11/1988 | Fubini | |
| 4,926,417 A | 5/1990 | Futami | |
| 4,939,652 A | 7/1990 | Steiner | |
| 5,032,821 A | 7/1991 | Domanico | |
| 5,119,504 A | 6/1992 | Durboraw, III | |
| 5,223,844 A | 6/1993 | Mansell et al. | |
| 5,225,842 A | 7/1993 | Brown et al. | |
| 5,305,214 A | 4/1994 | Komatsu | |
| 5,309,139 A | 5/1994 | Austin | |
| 5,311,197 A | 5/1994 | Sorden et al. | |
| 5,325,082 A | 6/1994 | Rodriguez | |
| 5,347,260 A | 9/1994 | Ginzel | |
| 5,359,528 A | 10/1994 | Haendel | |
| 5,365,114 A | 11/1994 | Tsurushima | |

(Continued)

FOREIGN PATENT DOCUMENTS

CA 2071931 12/1993

(Continued)

Primary Examiner—Willis R Wolfe, Jr.
(74) Attorney, Agent, or Firm—Steptoe & Johnson LLP

(57) ABSTRACT

System and method for modifying the operation of an engine comprising an engine control unit coupled to the engine, a command module coupled to the engine control unit, wherein the command module is operable to modify operating characteristics of the engine by reconfiguring the function of the engine control unit. The engine control unit further comprises software and/or firmware, and the command module reconfigures the function of the engine control unit by altering the software and/or firmware. The command module may modify the engine operation, for example, based upon environmental conditions, topographic conditions, and/or traffic conditions.

27 Claims, 1 Drawing Sheet

U.S. PATENT DOCUMENTS

| | | |
|---|---|---|
| 5,365,451 A | 11/1994 | Wang et al. |
| 5,394,136 A | 2/1995 | Lammers et al. |
| 5,400,018 A | 3/1995 | Scholl |
| 5,414,432 A | 5/1995 | Penny, Jr. et al. |
| 5,422,624 A | 6/1995 | Smith |
| 5,424,584 A | 6/1995 | Matsuda |
| 5,430,432 A | 7/1995 | Camhi |
| 5,436,612 A | 7/1995 | Aduddell |
| 5,436,837 A | 7/1995 | Gerstung |
| 5,446,659 A | 8/1995 | Yamawaki |
| 5,453,939 A | 9/1995 | Hoffman |
| 5,457,439 A | 10/1995 | Kuhn |
| 5,475,597 A | 12/1995 | Buck |
| 5,485,161 A | 1/1996 | Vaughn |
| 5,499,182 A | 3/1996 | Ousborne |
| 5,521,579 A | 5/1996 | Bernhard |
| 5,521,580 A | 5/1996 | Kaneko |
| 5,525,960 A | 6/1996 | McCall |
| 5,548,273 A | 8/1996 | Nicol |
| 5,581,464 A | 12/1996 | Woll |
| 5,586,130 A | 12/1996 | Doyle |
| 5,600,558 A | 2/1997 | Mearek |
| 5,612,875 A | 3/1997 | Haendel |
| 5,625,337 A | 4/1997 | Medawar |
| 5,638,077 A | 6/1997 | Martin |
| 5,642,284 A | 6/1997 | Parupalli |
| 5,648,755 A | 7/1997 | Yagihashi |
| 5,659,289 A | 8/1997 | Zonkoski |
| 5,689,067 A | 11/1997 | Klein |
| 5,708,417 A | 1/1998 | Tallman |
| 5,717,374 A | 2/1998 | Smith |
| 5,719,771 A | 2/1998 | Buck |
| 5,723,768 A | 3/1998 | Ammon |
| 5,740,548 A | 4/1998 | Hudgens |
| 5,742,915 A | 4/1998 | Stafford |
| 5,751,245 A | 5/1998 | Janky et al. |
| 5,764,139 A | 6/1998 | Nojima |
| 5,767,767 A | 6/1998 | Lima |
| 5,777,580 A | 7/1998 | Janky et al. |
| 5,795,997 A | 8/1998 | Gittins |
| 5,797,134 A | 8/1998 | McMillan et al. |
| 5,801,618 A | 9/1998 | Jenkins |
| 5,801,948 A | 9/1998 | Wood |
| 5,815,071 A | 9/1998 | Doyle |
| 5,825,283 A | 10/1998 | Camhi |
| 5,825,284 A | 10/1998 | Dunwoody |
| 5,844,475 A | 12/1998 | Horie |
| 5,847,271 A | 12/1998 | Poublon |
| 5,862,500 A | 1/1999 | Goodwin |
| 5,867,093 A | 2/1999 | Dodd |
| 5,877,678 A | 3/1999 | Donoho |
| 5,880,674 A | 3/1999 | Ufkes |
| 5,880,958 A | 3/1999 | Helms et al. |
| 5,883,594 A | 3/1999 | Lau |
| 5,892,434 A | 4/1999 | Carlson |
| 5,907,277 A | 5/1999 | Tokunaga |
| 5,914,654 A | 6/1999 | Smith |
| 5,918,180 A | 6/1999 | Dimino |
| 5,926,087 A | 7/1999 | Busch |
| 5,928,291 A | 7/1999 | Jenkins et al. |
| 5,945,919 A | 8/1999 | Trask |
| 5,949,330 A | 9/1999 | Hoffman |
| 5,949,331 A | 9/1999 | Schofield |
| 5,954,781 A | 9/1999 | Slepian |
| 5,955,942 A | 9/1999 | Slifkin |
| 5,957,986 A | 9/1999 | Coverdill |
| 5,964,816 A | 10/1999 | Kincaid |
| 5,969,600 A | 10/1999 | Tanguay |
| 5,974,356 A | 10/1999 | Doyle et al. |
| 5,978,737 A | 11/1999 | Pawlowski |
| 5,982,278 A | 11/1999 | Cuvelier |
| 5,987,976 A | 11/1999 | Sarangapani |
| 5,999,125 A | 12/1999 | Kurby |
| 6,002,327 A | 12/1999 | Boesch |
| 6,008,724 A | 12/1999 | Thompson |
| 6,018,293 A | 1/2000 | Smith |
| 6,026,292 A | 2/2000 | Coppinger et al. |
| 6,028,508 A | 2/2000 | Mason |
| 6,028,510 A | 2/2000 | Tamam |
| 6,037,861 A | 3/2000 | Ying |
| 6,037,862 A | 3/2000 | Ying |
| 6,038,496 A | 3/2000 | Dobler |
| 6,044,315 A | 3/2000 | Honeck |
| 6,059,066 A | 5/2000 | Lary |
| 6,064,928 A | 5/2000 | Wilson |
| 6,064,970 A | 5/2000 | McMillan et al. |
| 6,067,008 A | 5/2000 | Smith |
| 6,067,009 A | 5/2000 | Hozuka |
| 6,072,388 A | 6/2000 | Kyrtsos |
| 6,073,007 A | 6/2000 | Doyle |
| 6,075,458 A | 6/2000 | Ladner et al. |
| 6,078,853 A | 6/2000 | Ebner |
| 6,081,188 A | 6/2000 | Kutlucinar |
| 6,084,870 A | 7/2000 | Wooten et al. |
| 6,094,149 A | 7/2000 | Wilson |
| 6,098,048 A | 8/2000 | Dashefsky |
| 6,100,792 A | 8/2000 | Ogino |
| 6,104,282 A | 8/2000 | Fragoso |
| 6,108,591 A | 8/2000 | Segal et al. |
| 6,121,922 A | 9/2000 | Mohan |
| 6,124,810 A | 9/2000 | Segal et al. |
| 6,130,608 A | 10/2000 | McKeown |
| 6,131,067 A | 10/2000 | Girerd et al. |
| 6,133,827 A | 10/2000 | Alvey |
| 6,141,610 A | 10/2000 | Rothert |
| 6,147,598 A | 11/2000 | Murphy |
| 6,172,602 B1 | 1/2001 | Hasfjord |
| 6,184,784 B1 | 2/2001 | Shibuya |
| 6,185,501 B1 | 2/2001 | Smith |
| 6,198,995 B1 | 3/2001 | Settles |
| 6,204,756 B1 | 3/2001 | Senyk |
| 6,204,757 B1 | 3/2001 | Evans |
| 6,208,240 B1 | 3/2001 | Ledesma |
| 6,212,455 B1 | 4/2001 | Weaver |
| 6,216,066 B1 | 4/2001 | Goebel |
| 6,222,458 B1 | 4/2001 | Harris |
| 6,225,898 B1 | 5/2001 | Kamiya |
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,247,360 B1 | 6/2001 | Anderson |
| 6,249,219 B1 | 6/2001 | Perez |
| 6,253,129 B1 | 6/2001 | Jenkins et al. |
| 6,255,892 B1 | 7/2001 | Gartner et al. |
| 6,255,939 B1 | 7/2001 | Roth et al. |
| 6,262,658 B1 | 7/2001 | O'Connor |
| 6,265,989 B1 | 7/2001 | Taylor |
| 6,266,588 B1 | 7/2001 | McClellan |
| 6,278,361 B1 | 8/2001 | Magiawala |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,297,768 B1 | 10/2001 | Allen, Jr. |
| 6,301,533 B1 | 10/2001 | Markow |
| 6,308,120 B1 | 10/2001 | Good |
| 6,308,134 B1 | 10/2001 | Croyle et al. |
| 6,313,742 B1 | 11/2001 | Larson |
| 6,320,497 B1 | 11/2001 | Fukumoto |
| 6,331,825 B1 | 12/2001 | Ladner et al. |
| 6,333,686 B1 | 12/2001 | Waltzer |
| 6,337,653 B1 | 1/2002 | Bchler |

| Patent | Date | Name | | Patent | Date | Name |
|---|---|---|---|---|---|---|
| 6,339,739 B1 | 1/2002 | Folke | | 6,703,925 B2 | 3/2004 | Steffel |
| 6,344,805 B1 | 2/2002 | Yasui | | 6,710,738 B2 | 3/2004 | Allen, Jr. |
| 6,351,211 B1 | 2/2002 | Bussard | | 6,718,235 B1 | 4/2004 | Borugian |
| 6,356,188 B1 | 3/2002 | Meyers | | 6,718,239 B2 | 4/2004 | Rayner |
| 6,356,822 B1 | 3/2002 | Diaz | | 6,727,809 B1 | 4/2004 | Smith |
| 6,356,833 B2 | 3/2002 | Jeon | | 6,728,605 B2 | 4/2004 | Lash |
| 6,359,554 B1 | 3/2002 | Skibinski | | 6,732,031 B1 * | 5/2004 | Lightner et al. ............... 701/33 |
| 6,362,730 B2 | 3/2002 | Razavi | | 6,732,032 B1 | 5/2004 | Banet |
| 6,362,734 B1 | 3/2002 | McQuade | | 6,737,962 B2 | 5/2004 | Mayor |
| 6,366,199 B1 | 4/2002 | Osborn | | 6,741,169 B2 | 5/2004 | Magiawala |
| 6,378,959 B2 | 4/2002 | Lesesky | | 6,741,170 B2 | 5/2004 | Alrabady |
| 6,389,340 B1 | 5/2002 | Rayner | | 6,745,153 B2 | 6/2004 | White |
| 6,393,348 B1 | 5/2002 | Ziegler | | 6,748,322 B1 | 6/2004 | Fernandez |
| 6,404,329 B1 | 6/2002 | Hsu | | 6,750,761 B1 | 6/2004 | Newman |
| 6,405,112 B1 | 6/2002 | Rayner | | 6,750,762 B1 | 6/2004 | Porter |
| 6,424,268 B1 | 7/2002 | Isonaga | | 6,756,916 B2 | 6/2004 | Yanai |
| 6,427,687 B1 | 8/2002 | Kirk | | 6,759,952 B2 | 7/2004 | Dunbridge |
| 6,430,488 B1 | 8/2002 | Goldman | | 6,760,659 B1 * | 7/2004 | Cowen ....................... 701/115 |
| 6,433,681 B1 | 8/2002 | Foo | | 6,768,448 B2 | 7/2004 | Farmer |
| 6,441,732 B1 | 8/2002 | Laitsaari | | 6,775,602 B2 | 8/2004 | Gordon |
| 6,449,540 B1 | 9/2002 | Rayner | | 6,778,068 B2 | 8/2004 | Wolfe |
| 6,459,367 B1 | 10/2002 | Green | | 6,778,885 B2 | 8/2004 | Agashe et al. |
| 6,459,369 B1 | 10/2002 | Wang | | 6,784,793 B2 | 8/2004 | Gagnon |
| 6,459,961 B1 | 10/2002 | Obradovich | | 6,784,832 B2 | 8/2004 | Knockeart et al. |
| 6,459,969 B1 | 10/2002 | Bates | | 6,788,196 B2 | 9/2004 | Ueda |
| 6,462,675 B1 | 10/2002 | Humphrey | | 6,788,207 B2 | 9/2004 | Wilkerson |
| 6,472,979 B2 | 10/2002 | Schofield | | 6,792,339 B2 | 9/2004 | Basson |
| 6,476,763 B2 | 11/2002 | Allen, Jr. | | 6,795,017 B1 | 9/2004 | Puranik et al. |
| 6,480,106 B1 | 11/2002 | Crombez | | 6,798,354 B2 | 9/2004 | Schuessler |
| 6,484,035 B2 | 11/2002 | Allen, Jr. | | 6,803,854 B1 | 10/2004 | Adams et al. |
| 6,484,091 B2 | 11/2002 | Shibata | | 6,807,481 B1 | 10/2004 | Gastelum |
| 6,493,650 B1 | 12/2002 | Rodgers | | 6,813,549 B2 | 11/2004 | Good |
| 6,512,969 B1 | 1/2003 | Wang | | 6,819,236 B2 | 11/2004 | Kawai |
| 6,512,974 B2 * | 1/2003 | Houston et al. ............. 701/115 | | 6,832,141 B2 | 12/2004 | Skeen et al. |
| 6,515,596 B2 | 2/2003 | Awada | | 6,845,314 B2 | 1/2005 | Fosseen |
| 6,519,512 B1 | 2/2003 | Haas | | 6,845,317 B2 | 1/2005 | Craine |
| 6,525,672 B2 | 2/2003 | Chainer | | 6,847,872 B2 | 1/2005 | Bodin |
| 6,526,341 B1 | 2/2003 | Bird et al. | | 6,847,873 B1 | 1/2005 | Li |
| 6,529,159 B1 | 3/2003 | Fan et al. | | 6,859,039 B2 | 2/2005 | Horie |
| 6,535,116 B1 | 3/2003 | Zhou | | 6,859,695 B2 | 2/2005 | Klausner |
| 6,542,074 B1 | 4/2003 | Tharman | | 6,865,457 B1 | 3/2005 | Mittelsteadt |
| 6,542,794 B2 | 4/2003 | Obradovich | | 6,867,733 B2 | 3/2005 | Sandhu et al. |
| 6,549,834 B1 | 4/2003 | McClellan | | 6,868,386 B1 | 3/2005 | Henderson et al. |
| 6,552,682 B1 | 4/2003 | Fan | | 6,870,469 B2 | 3/2005 | Ueda |
| 6,556,905 B1 | 4/2003 | Mittelsteadt | | 6,873,253 B2 | 3/2005 | Veziris |
| 6,559,769 B2 | 5/2003 | Anthony | | 6,873,261 B2 | 3/2005 | Anthony |
| 6,564,126 B1 | 5/2003 | Lin | | 6,879,894 B1 | 4/2005 | Lightner |
| 6,567,000 B2 | 5/2003 | Slifkin | | 6,885,293 B2 | 4/2005 | Okumura |
| 6,571,168 B1 | 5/2003 | Murphy | | 6,892,131 B2 | 5/2005 | Coffee |
| 6,587,759 B2 | 7/2003 | Obradovich | | 6,894,611 B2 * | 5/2005 | Butz et al. ............... 340/539.1 |
| 6,594,579 B1 | 7/2003 | Lowrey | | 6,895,332 B2 | 5/2005 | King |
| 6,599,243 B2 | 7/2003 | Woltermann | | 6,909,398 B2 | 6/2005 | Knockeart et al. |
| 6,600,985 B2 | 7/2003 | Weaver | | 6,914,523 B2 | 7/2005 | Munch |
| 6,604,033 B1 | 8/2003 | Banet | | 6,922,133 B2 | 7/2005 | Wolfe |
| 6,611,740 B2 | 8/2003 | Lowrey | | 6,922,616 B2 | 7/2005 | Obradovich |
| 6,611,755 B1 | 8/2003 | Coffee | | 6,922,622 B2 | 7/2005 | Dulin |
| 6,629,029 B1 | 9/2003 | Giles | | 6,925,425 B2 | 8/2005 | Remboski |
| 6,630,884 B1 | 10/2003 | Shanmugham | | 6,928,348 B1 | 8/2005 | Lightner |
| 6,633,807 B2 * | 10/2003 | Augsburger et al. ........ 701/115 | | 6,937,162 B2 | 8/2005 | Tokitsu |
| 6,636,790 B1 | 10/2003 | Lightner | | 6,950,013 B2 | 9/2005 | Scaman |
| 6,639,512 B1 | 10/2003 | Lee | | 6,954,140 B2 | 10/2005 | Holler |
| 6,643,578 B2 | 11/2003 | Levine | | 6,958,976 B2 | 10/2005 | Kikkawa |
| 6,651,001 B2 | 11/2003 | Apsell | | 6,968,311 B2 | 11/2005 | Knockeart et al. |
| 6,654,682 B2 | 11/2003 | Kane et al. | | 6,970,075 B2 | 11/2005 | Cherouny |
| 6,657,540 B2 | 12/2003 | Knapp | | 6,970,783 B2 | 11/2005 | Knockeart et al. |
| 6,662,013 B2 | 12/2003 | Takiguchi et al. | | 6,972,669 B2 | 12/2005 | Saito |
| 6,664,922 B1 | 12/2003 | Fan | | 6,980,131 B1 | 12/2005 | Taylor |
| 6,665,613 B2 | 12/2003 | Duvall | | 6,981,565 B2 | 1/2006 | Gleacher |
| 6,674,362 B2 | 1/2004 | Yoshioka | | 6,982,636 B1 | 1/2006 | Bennie |
| 6,675,085 B2 | 1/2004 | Straub | | 6,983,200 B2 | 1/2006 | Bodin |
| 6,677,854 B2 | 1/2004 | Dix | | 6,988,033 B1 | 1/2006 | Lowrey |
| 6,678,612 B1 | 1/2004 | Khawam | | 6,989,739 B2 | 1/2006 | Li |
| 6,696,932 B2 | 2/2004 | Skibinski | | 7,002,454 B1 | 2/2006 | Gustafson |

| | | | | | | |
|---|---|---|---|---|---|---|
| 7,002,579 B2 | 2/2006 | Olson | | 7,260,497 B2 | 8/2007 | Watabe |
| 7,005,975 B2 | 2/2006 | Lehner | | RE39,845 E | 9/2007 | Hasfjord |
| 7,006,820 B1 | 2/2006 | Parker et al. | | 7,269,530 B1 | 9/2007 | Lin |
| 7,019,641 B1 | 3/2006 | Lakshmanan | | 7,271,716 B2 | 9/2007 | Nou |
| 7,023,321 B2 | 4/2006 | Brillon et al. | | 7,273,172 B2 | 9/2007 | Olsen |
| 7,023,332 B2 | 4/2006 | Saito | | 7,280,046 B2 | 10/2007 | Berg |
| 7,024,318 B2 | 4/2006 | Fischer | | 7,283,904 B2 | 10/2007 | Benjamin |
| 7,027,808 B2 | 4/2006 | Wesby | | 7,286,917 B2 | 10/2007 | Hawkins |
| 7,034,705 B2 | 4/2006 | Yoshioka | | 7,286,929 B2 | 10/2007 | Staton |
| 7,038,578 B2 | 5/2006 | Will | | 7,289,024 B2 | 10/2007 | Sumcad |
| 7,042,347 B2 | 5/2006 | Cherouny | | 7,289,035 B2 | 10/2007 | Nathan |
| 7,047,114 B1 | 5/2006 | Rogers | | 7,292,152 B2 | 11/2007 | Torkkola |
| 7,049,941 B2 | 5/2006 | Rivera-Cintron | | 7,292,159 B2 | 11/2007 | Culpepper |
| 7,059,689 B2 | 6/2006 | Lesesky | | 7,298,248 B2 | 11/2007 | Finley |
| 7,069,126 B2 | 6/2006 | Bernard | | 7,298,249 B2 | 11/2007 | Avery |
| 7,069,134 B2 | 6/2006 | Williams | | 7,301,445 B2 | 11/2007 | Moughler |
| 7,072,753 B2 | 7/2006 | Eberle | | 7,317,383 B2 | 1/2008 | Ihara |
| 7,081,811 B2 | 7/2006 | Johnston | | 7,317,392 B2 | 1/2008 | DuRocher |
| 7,084,755 B1 | 8/2006 | Nord | | 7,317,927 B2 | 1/2008 | Staton |
| 7,088,225 B2 | 8/2006 | Yoshioka | | 7,319,848 B2 | 1/2008 | Obradovich |
| 7,089,116 B2 | 8/2006 | Smith | | 7,321,294 B2 | 1/2008 | Mizumaki |
| 7,091,880 B2 | 8/2006 | Sorensen | | 7,321,825 B2 | 1/2008 | Ranalli |
| 7,098,812 B2 | 8/2006 | Hirota | | 7,323,972 B2 | 1/2008 | Nobusawa |
| 7,099,750 B2 | 8/2006 | Miyazawa | | 7,323,974 B2 | 1/2008 | Schmid |
| 7,099,774 B2 | 8/2006 | King | | 7,323,982 B2 | 1/2008 | Staton |
| 7,102,496 B1 | 9/2006 | Ernst | | 7,327,239 B2 | 2/2008 | Gallant |
| 7,109,853 B1 | 9/2006 | Mattson | | 7,327,258 B2 | 2/2008 | Fast |
| 7,113,081 B1 | 9/2006 | Reichow | | 7,333,883 B2 | 2/2008 | Geborek |
| 7,113,107 B2 | 9/2006 | Taylor | | 7,339,460 B2 | 3/2008 | Lane |
| 7,113,127 B1 * | 9/2006 | Banet et al. .................. 701/29 | | 7,349,782 B2 | 3/2008 | Churchill |
| 7,117,075 B1 | 10/2006 | Larschan et al. | | 7,352,081 B2 | 4/2008 | Taurasi |
| 7,119,696 B2 | 10/2006 | Borugian | | 7,355,508 B2 | 4/2008 | Mian |
| 7,124,027 B1 | 10/2006 | Ernst | | 7,365,639 B2 | 4/2008 | Yuhara |
| 7,124,088 B2 | 10/2006 | Bauer et al. | | 7,366,551 B1 | 4/2008 | Hartley |
| 7,129,825 B2 | 10/2006 | Weber | | 7,375,624 B2 | 5/2008 | Hines |
| 7,132,934 B2 | 11/2006 | Allison | | 7,376,499 B2 | 5/2008 | Salman |
| 7,132,937 B2 | 11/2006 | Lu | | 7,378,946 B2 | 5/2008 | Lahr |
| 7,132,938 B2 | 11/2006 | Suzuki | | 7,378,949 B2 | 5/2008 | Chen |
| 7,133,755 B2 | 11/2006 | Salman | | 7,386,394 B2 | 6/2008 | Shulman |
| 7,135,983 B2 | 11/2006 | Filippov | | 7,447,574 B1 * | 11/2008 | Washicko et al. ............ 701/29 |
| 7,138,916 B2 | 11/2006 | Schwartz | | 2003/0055555 A1 | 3/2003 | Knockeart et al. |
| 7,139,661 B2 | 11/2006 | Holze | | 2004/0039504 A1 | 2/2004 | Coffee et al. |
| 7,145,442 B1 | 12/2006 | Wai | | 2004/0066330 A1 | 4/2004 | Knockeart et al. |
| 7,149,206 B2 | 12/2006 | Pruzan | | 2004/0077339 A1 | 4/2004 | Martens |
| 7,161,473 B2 | 1/2007 | Hoshal | | 2004/0083041 A1 | 4/2004 | Skeen et al. |
| 7,164,986 B2 | 1/2007 | Humphries | | 2004/0142672 A1 | 7/2004 | Stankewitz |
| 7,170,390 B2 | 1/2007 | Quiñones | | 2005/0064835 A1 | 3/2005 | Gusler |
| 7,170,400 B2 | 1/2007 | Cowelchuk | | 2005/0091018 A1 | 4/2005 | Craft |
| 7,174,243 B1 | 2/2007 | Lightner | | 2005/0096809 A1 | 5/2005 | Skeen et al. |
| 7,180,407 B1 | 2/2007 | Guo | | 2005/0137757 A1 | 6/2005 | Phelan et al. |
| 7,180,409 B1 | 2/2007 | Brey | | 2006/0154687 A1 | 7/2006 | McDowell |
| 7,187,271 B2 | 3/2007 | Nagata | | 2006/0234711 A1 | 10/2006 | McArdle |
| 7,196,629 B2 | 3/2007 | Ruoss | | 2007/0229234 A1 | 10/2007 | Smith |
| 7,216,035 B2 | 5/2007 | Hörtner | | 2007/0293206 A1 | 12/2007 | Lund |
| 7,218,211 B2 | 5/2007 | Ho | | 2008/0023965 A1 * | 1/2008 | Cagliari et al. ............ 290/1 B |
| 7,222,009 B2 | 5/2007 | Hijikata | | 2008/0064413 A1 | 3/2008 | Breed |
| 7,225,065 B1 | 5/2007 | Hunt | | 2008/0255888 A1 | 10/2008 | Berkobin |
| 7,228,211 B1 | 6/2007 | Lowrey | | | | |
| 7,233,235 B2 | 6/2007 | Pavlish | | | | |
| 7,236,862 B2 | 6/2007 | Kanno | | | | |
| 7,239,948 B2 | 7/2007 | Nimmo et al. | | | | |
| 7,256,686 B2 | 8/2007 | Koutsky | | | | |
| 7,256,700 B1 | 8/2007 | Ruocco | | | | |
| 7,256,702 B2 | 8/2007 | Isaacs | | | | |

FOREIGN PATENT DOCUMENTS

| | | |
|---|---|---|
| JP | 2007235530 | 9/2007 |
| WO | WO2005109369 | 11/2005 |
| WO | WO2008109477 | 9/2008 |

* cited by examiner

SYSTEM AND METHOD FOR RECONFIGURING AN ELECTRONIC CONTROL UNIT OF A MOTOR VEHICLE TO OPTIMIZE FUEL ECONOMY

This application claims the benefit of U.S. Provisional Application No. 60/848,681, filed on Oct. 2, 2006, entitled "System and Method for Reconfiguring an Electronic Control Unit of a Motor Vehicle to Optimize Fuel Economy," which application is hereby incorporated by reference herein in its entirety.

TECHNICAL FIELD

The present invention relates generally to engine management and, more particularly, to a system and method for reconfiguring an electronic control unit of a motor vehicle in order to optimize fuel economy thereof.

BACKGROUND

Tuning of the electronic control module (ECM) of an internal combustion engine is a well-known technique of modifying the software of the ECM to change the performance characteristics of the engine. One of the primary goals in tuning or modifying the ECM is to boost engine power. Such performance tuning is typically facilitated by replacing at least one of the factory-supplied Erasable Programmable Read-Only Memory (EPROM) or Electrically Erasable PROM (EEPROM) chips in the ECM with an aftermarket tuning chip. The ECM may also be tuned or modified by directly downloading additional software to the ECM or by reprogramming the ECM via the on-board diagnostic system (e.g. OBD II) port or interface found on many modern motor vehicles.

ECM settings from the factory are typically configured to provide a balance of performance (e.g., moderate acceleration from a stop and during passing) as well as fuel economy while also meeting state and federal (i.e., EPA) fuel emissions requirements. The factory-set ECM is also typically configured to maximize engine life by preventing or minimizing detonation or pre-ignition of the fuel-air mixture in the combustion chamber which, over time, can result in damage to engine parts.

Aftermarket tuning chips generally increase engine performance by increasing the rate at which fuel is delivered to the engine for a given engine speed with a concurrent reduction in fuel economy and an increase in vehicle exhaust emissions. In addition, aftermarket chips may also revise the spark timing as compared to the factory settings in order to increase engine performance but also at the expense of fuel economy. Even further, certain tuning chips may result in an increase in horsepower and torque supplied by the engine but which can result in damage to the vehicle transmission due to the excess torque delivered to the transmission.

In contrast to the above-described goals of prior art tuning chips to boost engine power, it is desirable in certain applications to reconfigure the ECM in order to maximize fuel economy, but at the expense of engine performance or engine life. In a large fleet of trucks, it may be desirable to maximize fuel economy of each truck in the fleet at the expense of engine horsepower, torque and other performance parameters. For example, many long-haul trucks have diesel engines that operate at a generally constant speed while the truck travels over very large distances on mostly flat and level terrain. For these vehicles, it is desirable to reconfigure the ECM settings to provide enhanced fuel economy beyond that which is achievable with the factory-set ECM.

As can be seen, there exists a need in the art for a system for reconfiguring the ECM of a motor vehicle in order to optimize fuel economy at the expense of engine performance, engine life and increased vehicle exhaust emissions.

SUMMARY OF THE INVENTION

In one embodiment of the invention, a system and method for modifying the operation of an engine comprises an engine control unit coupled to the engine, a command module coupled to the engine control unit, wherein the command module is operable to modify operating characteristics of the engine by reconfiguring the function of the engine control unit. The engine control unit further comprises software and/or firmware, and the command module reconfigures the function of the engine control unit by altering the software and/or firmware. The command module may modify the engine operation, for example, based upon environmental conditions, topographic conditions, and/or traffic conditions.

One or more accelerometers may be coupled to the command module. The command module may reconfigure the function of the engine control unit based upon data from the one or more accelerometers. An on-board diagnostic system for the engine may be coupled to the command module. The command module may receive vehicle performance data from the on-board diagnostic system, and may reconfigure the function of the engine control unit based upon data from the on-board diagnostic system. The command module may also reconfigure the function of the engine control unit via the on-board diagnostic system. The engine operation may be modified to improve and/or maximize fuel economy.

The function of the engine control unit may be reconfigured by a tuning chip that replaces an existing erasable programmable, read-only memory (EPROM) chip. A remote base station may be in communication with the command module. The command module may be adapted to receive engine configuration commands transmitted from the remote base station.

In another embodiment of the invention, a system and method for controlling the operation of an engine comprises receiving an engine operation command at a command module in a vehicle, and reconfiguring an engine control device in response to the engine operation command. The command module may receive the engine operation command via a wireless link to a base station. The command module may be coupled to the engine control device via an on-board diagnostic system for the vehicle. The command module may reconfigure a function of the engine control device via the on-board diagnostic system. The engine control device may be adapted to be reconfigured by a tuning chip that replaces an existing erasable programmable, read-only memory (EPROM) chip. The function of the engine control device may be reconfigured by altering software or firmware in the engine control device. The reconfiguring may modify an engine operation based upon various conditions such as environmental conditions, topographic conditions, and/or traffic conditions.

In another embodiment, a system and method for controlling the operation of an engine comprises receiving, at a command module, vehicle operation data from a vehicle monitoring system in a vehicle, and reconfiguring an engine control device in response to the vehicle operation data. The vehicle monitoring system may comprise one or more accelerometers, and a function of the engine control device may be reconfigured based upon data from the one or more accelerometers. The function of the engine control device may be reconfigured based upon data from an on-board diagnostic system for the vehicle. The command module may also reconfigure the function of the engine control device via the on-board diagnostic system. The engine performance parameters may be changed according to work load, according to throttle input, topography, or both. Under various conditions, the engine operation may be modified to maximize fuel economy.

The present invention provides the capability to alter engine operating parameters in order to improve and/or maximize fuel efficiency for a given set of conditions including at least one of the following:

a) land topography (hills and valleys);

b) road design (natural or man-made obstacles resulting in traffic slowing, e.g. limited visibility, tight turns, etc);

c) road construction, lane merging;

d) traffic flow (current, instantaneous and/or predicted, i.e. modify engine parameters for fuel efficiency during stop-and-go traffic, during morning and evening commute loads, sporting events, or random accidents/incidents that create slowing);

e) environmental conditions;

f) current vehicle condition (including, for example, vehicle weight, tire pressure, exhaust temperature, vehicle fluid condition, various sensor condition, various filter condition). Identifying the location of the vehicle, using, for example, GPS or another form of location generating signal technology, is used in some embodiments to place the vehicle on a given road at a given time. Embodiments of the invention also provide two-way communication with the vehicle's operational computer so that vehicular performance, vehicle sensors, filters, fluids, driving conditions and/or vehicle circumstances can be determined or analyzed remotely.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
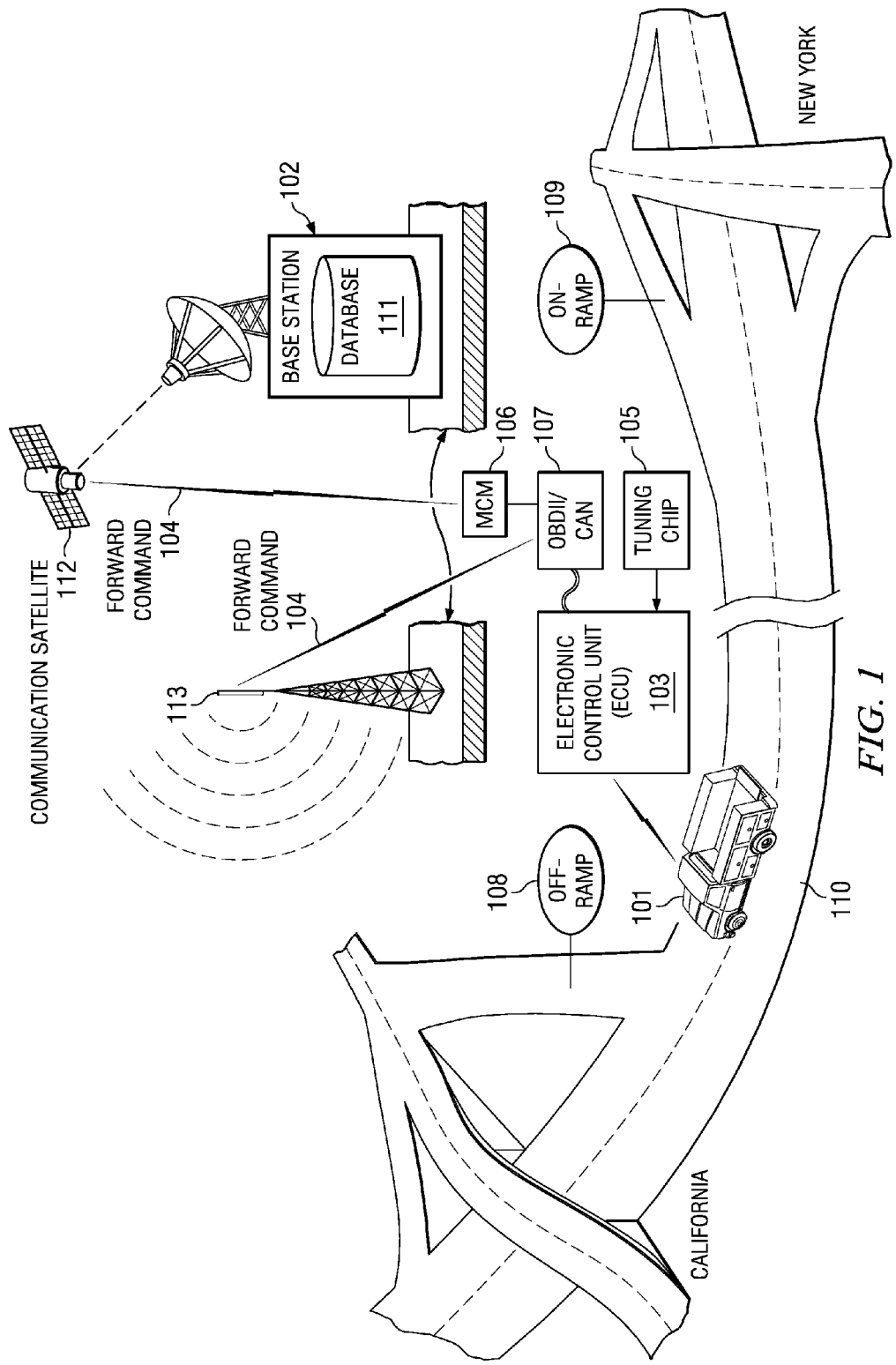
FIG. 1 illustrates a vehicle using one embodiment of the present invention.

Referring now to the drawing, wherein the showing is for purposes of illustrating a preferred embodiment of the present invention and is not for purposes of limiting the same. FIG. 1 is an illustration of a motor vehicle in wireless communication with a base station wherein the motor vehicle includes an electronic control unit (ECM) and a master command module (MCM) for receiving a forward command from the base station for reconfiguring ECM and wherein the ECM is further adapted to receive a tuning chip for reconfiguring the ECM.

Shown in FIG. 1 is motor vehicle 101, which may be part of a fleet of vehicles, and which is in wireless communication with base station 102. The base station 102 is adapted to transmit a forward command 104 to the vehicle for reconfiguring a processor or electronic control unit (ECM) 103 of an internal combustion engine, such as a diesel engine of the vehicle, in order to modify the performance aspects thereof. More specifically, the system and method of the present invention relates to reconfiguring ECM 103 of motor vehicle 101 in order to optimize fuel economy thereof; however, ECM 103 may also be reconfigured such that less optimal performance, such as reduced engine performance, increased wear on the engine and drive train, and increased exhaust emissions, may result.

As provided in the present invention, ECM 103 may be reprogrammable or reconfigured via several different methods in order to alter the control characteristics of ECM 103. For example, ECM 103 may be reconfigured dynamically via forward command 104 that may be sent to the vehicle from remote base station 102 and which may temporarily or permanently alter ECM 103 to minimize fuel consumption of vehicle 101. Forward command 104 may be transmitted using any available communication method including, for example, cellular, satellite, WiFi, Bluetooth, infrared, ultrasound, short wave, microwave, radio frequency (RF), data link, or any other suitable network, protocol or technology for communicating voice and/or data. In one embodiment, satellite communication network 112 may be used to transmit forward command 104. In another embodiment, cellular or RF network 113 may be used to transmit forward command 104. It will be understood that these networks, or others, may also be operable to transmit other information or data to vehicle 101 and to receive reverse commands, information and data from vehicle 101.

Alternatively, tuning chip 105 can be installed in ECM 103 as a replacement for one of the factory-installed Erasable Programmable Read-Only Memory (EPROM) or Electrically Erasable PROM (EEPROM) chips of ECM 103. Alternatively, tuning chip 105 can be installed in ECM 103 as a supplement for one of the factory-installed chips of ECM 103. The replacement or supplement tuning chip 105 is preferably configured to alter or modify engine operating parameters in order to maximize fuel economy at the expense of the ability to generate horsepower, torque, and other performance parameters.

Forward command 104 may be sent wirelessly (e.g., via cellular, satellite, WiFi, Bluetooth, or any other suitable technology) from base station 102 to motor vehicle 101 and may be received by ECM 103 and/or by Master Command Module (MCM) 106 in the vehicle. MCM 106 may be connected to ECM 103 via any suitable wireless and/or hardwire connection. Forward command 104 may reprogram ECM 103 via OBDII port 107 of motor vehicle 101, or ECM 103 may itself include the capability to receive forward command 104.

Regardless of the method by which the forward command is received, forward command 104 preferably updates or reconfigures the software and/or firmware of ECM 103 in order to alter the operating characteristics of the engine in order to enhance the fuel economy of vehicle 101. The ECM 103 may also be manually reprogrammed such as by the vehicle operator in the cab of the vehicle. In addition, ECM 103 may be reprogrammed at base station 102 or at a maintenance facility. ECM 103 may be reconfigured to operate at a static setting or it may include the capability to selectively switch from factory or default settings to the reconfigured settings.

The reprogrammed ECM 103 may be further configured to regulate operation of the diesel engine over a relatively lengthy time period such as for a predetermined time period(s) or for an indefinite time period. For example, as shown in FIG. 1, ECM 103 may be reconfigured by tuning chip 105 such that the revised settings of ECM 103 operate between off/on ramps 108, 109 of freeway 110. In this manner, the revised settings of ECM 103 are activated when motor vehicle 101 is traveling along general straight and level sections of freeway 110 where there is little change in elevation, such that ECM 103 alters engine performance so that fuel economy can be maximized.

Optionally, tuning chip 105 or other reprogramming may be such that ECM 103 allows for enhanced acceleration of motor vehicle 101 during specific and predetermined scenarios. For example, ECM 103 may be configured to allow for enhanced acceleration of vehicle 101 at specific on-ramps that are known to provide a relatively short run-up distance over which motor vehicle 101 may accelerate to speed and safely merge with freeway traffic. Alternatively, tuning chip 105 may be configured to operate over relatively short periods of time or any combination of short and lengthy time periods.

ECM 103 may also be reprogrammed (e.g., by forward command 104, tuning chip 105, etc.) to increase the vehicle fuel economy on a consistent basis, or ECM 103 may be configured to be adjustable dynamically such as to meet changes in environmental conditions (e.g., changes in outside air temperature, humidity, air pressure, etc.) and/or changes in topographic conditions (e.g., changes in elevation, grade, rate of ascent and descent, etc.). For example, when vehicle 101 is traveling down a steep hill, tuning chip 105 may be configured to alter various engine parameters to maximize fuel conservation. Such dynamic change capability may be preprogrammed into vehicle 101 to occur autonomously or may be manually input by forward command 104 from base station 102 or by driver input.

Database 111 in base station 102 stores data related to vehicle 101 and ECM 103 for various vehicles. Database 111 may include a record of various incidents or environmental conditions (e.g., road, weather) experienced by other fleet vehicles traveling through that location. Database 111 and/or base station 102 may be configured to include artificial intelligence. ECM 103 may be coupled to database 111 artificial intelligence via two-way (i.e., wireless) communication with database 111 at base station 102. For example, database 111 may record accidents that occur repeatedly at specific locations on a highway as determined by GPS location coordinates sent to database 111 upon the occurrence of an accident.

In this manner, MCM 106 may alert and adjust the operating parameters (e.g., adjust ECM 103) of the vehicle as well as alert the driver upon approaching the accident location such that the driver may reduce speed and take other necessary precautions. At this time, ECM 103 may be commanded or preprogrammed to reduce engine performance (e.g., horsepower, torque, etc.) at such accident locations to avoid excessive speed by the vehicle which could result in another accident at that location.

Other operating parameters may be adjusted by reconfigured ECM 103. For example, in motor vehicles including an exhaust turbine, 103 ECM may be reconfigured (e.g. via tuning chip 105 or forward command 104) to allow over-revving of the exhaust turbine, which typically would result in increased engine and drive train wear. In such a scenario, ECM 103 would sacrifice long-term engine life in order to provide enhanced performance. For example, an engine rated at a useful life of 250,000 miles may experience a reduction in operating life to 100,000 miles. This reduction would occur due to accelerated wear and tear on the engine as a result of the higher operating pressures within the engine and on the drive train (e.g., transmission).

Conversely, ECM 103 may be reconfigured to provide an increase in engine life from 250,000 miles to 500,000 miles due to the reduced performance output of the engine and reduced wear and tear on the drive train while still providing enhanced fuel economy and compliance with emission requirements. However, it is contemplated that ECM 103 may include the capability to temporarily suspended compliance with emission requirements during predetermined events by allowing for a temporary increasing engine performance such as may be desired in emergency situations (e.g., during crash avoidance maneuvers).

Alternatively, ECM 103 may be reconfigured to provide the best possible fuel economy depending on the specific conditions and environments encountered by vehicle 101. For example, in an aggressive setting of ECM 103, throttle position may be drastically reduced such as during a descent (i.e., a downhill stretch of freeway). Alternatively, ECM 103 may be reconfigured to allow for enhanced performance in an on-ramp situation in order to allow vehicle 101 to accelerate properly.

The ability to reconfigure ECM 103 may be provided in conjunction with the operation of a vehicle monitoring system for monitoring at least one vehicle in the fleet. The vehicle monitoring system may further allow for monitoring driver behavior in order to improve safety and reduce fuel and maintenance costs for the fleet. Such a vehicle monitoring and driver mentoring system may be similar to that provided by the WaySmart™ System which is commercially available from Independent Witness, Inc. of Salt Lake City, Utah. A vehicle monitoring system that may be used to evaluate and grade driver behavior, is described in U.S. patent application Ser. No. 11/755,556, filed on May 30, 2007, entitled "System and Method for Evaluating Driver Behavior," the disclosure of which is hereby incorporated by reference herein in its entirety. Another vehicle monitoring system that may be used to provide feedback and mentoring to a driver in order improve driver performance and driving behavior, is described in U.S. patent application Ser. No. 11/768,056, filed on Jun. 25, 2007, entitled "System and Method for Monitoring and Improving Driver Behavior," the disclosure of which is hereby incorporated by reference herein in its entirety. In the WaySmart™ System, driver behavior is monitored with the aid of an accelerometer module (XLM) that includes at least one accelerometer for measuring at least one of lateral (sideways), longitudinal (forward and aft), and vertical acceleration in order to determine whether the driver is operating the vehicle in an unsafe or aggressive manner.

For example, excessive lateral acceleration may be an indication that the driver is operating the vehicle at an excessive speed around a turn along a roadway. Furthermore, it is possible that the driver may be traveling at a speed well within the posted speed limit for that area of roadway. However, excessive lateral acceleration, defined herein as "hard turns," may be indicative of aggressive driving by the driver and may contribute to excessive wear on tires and steering components as well as potentially causing the load such as a trailer to shift and potentially overturn.

Furthermore, such hard turns by a particular driver could eventually result in personal injury to the driver/occupants as well as property damage to the vehicle and load carried thereby and damage to anything impacted by the vehicle should it depart the roadway. Ultimately, such hard turns could result in loss of life if the vehicle is a large truck and the driver loses control resulting in a collision with a smaller vehicle such as a passenger automobile.

As such, it can be seen that monitoring and mentoring such driver behavior by providing warnings to the driver during the occurrence of aggressive driving such as hard turns can improve safety and reduce accidents. In addition, mentoring such aggressive driver behavior can reduce wear and tear on the vehicle and ultimately reduce fleet maintenance costs as well as reduce insurance costs and identify at risk drivers and driving behavior to fleet managers.

In one embodiment, the vehicle monitoring system includes master command module (MCM) 106 which may be in data communication with an on-board diagnostic (OBDII) system of vehicle 101, such as via port or data bus 107. In some vehicle models, MCM 106 is placed in data communication with a controller area network (CAN) system or bus to allow acquisition by MCM 106 of certain vehicle operating parameters including, but not limited to, vehicle speed such as via the speedometer, engine speed or throttle position such as via the tachometer, mileage such as via the odometer reading, seat belt status, condition of various vehicle systems including an anti-lock-braking system (ABS), turn signal, headlight, cruise control activation and a multitude of various other diagnostic parameters such as engine temperature, brake wear, etc.

The OBD or CAN allows for acquisition of the above-mentioned vehicle parameters by MCM 106 for processing thereby and/or for subsequent transmission to the database. In order to enhance reliability and extend its useful life, it is contemplated that MCM 106 is housed in a sealable housing which may be configured to provide varying degrees of waterproof protection. For operation in extreme temperatures, a heater mechanism may be provided to the housing to enable reliable operation in cold and severe service environments. Ideally, the housing contents (e.g., MCM, XLM, accelerometers, etc.) or the housing itself is configured to withstand excessive vibration and/or shock. MCM 106 may be mounted in any location in the vehicle such as underneath the seat. MCM 106 may further include an external power source, such as a battery, fuel cell, recharger, AC/DC adapter, DC bus connector (e.g. accessory or cigarette lighter plug), hot lead to vehicle fuse panel, etc., for powering MCM 106.

In one embodiment, the vehicle monitoring system may further include a self-contained and tamper-resistant event data recorder or crash data recorder (CDR) similar to that which is shown and disclosed in U.S. Pat. Nos. 6,266,588 and 6,549,834 issued to McClellan et al., the disclosures of which are hereby incorporated by reference herein in their entirety, and which is commercially known as "Witness" and commercially available from Independent Witness, Inc. of Salt Lake City, Utah. The CDR is adapted to continuously monitor vehicle motion and begin recording upon supra-threshold impacts whereupon it records the magnitude and direction of accelerations or G-forces experienced by the vehicle as well as recording an acceleration time-history of the impact event and velocity change between pre- and post-impact for a configurable duration following said impact. The recordings are time-date stamped and are providable to MCM 106 for subsequent transmission to the server data collection system (DCS) if accelerations exceed an impulse threshold.

In addition, the CDR is configured such that data is downloadable such as via a laptop directly from the CDR at the scene of the accident or the CDR itself can be removed from the vehicle for later downloading of data. As will be described in greater detail below, the data (e.g., crash impulses) recorded by the CDR can be correlated to accident severity and injury potential. It is contemplated that CDR data can be combined with recording of driver behavior via the accelerometer module (XLM) in order to determine the probability of crash impact as a cause of personal injury and/or property damage.

Furthermore, the CDR, such as that disclosed in the McClellan references (U.S. Pat. Nos. 6,266,588 and 6,549,834), is Society of Automotive Engineers (SAE) J211-compliant such that data recorded thereby is admissible in court and can be used to facilitate accident reconstruction as well as for insurance claim purposes. As was earlier mentioned, the CDR is preferably a self-contained component that includes its own power source such as a battery such that the vehicle can operate regardless of the lack of power from the vehicle due to the accident.

Importantly, the XLM may be integrated with MCM 106 and mounted within the same housing. The XLM is operative to monitor driver performance by measuring vehicle acceleration in at least one of lateral, longitudinal and vertical directions over a predetermined time period such as over seconds or minutes. The XLM may include a single uni-axial accelerometer to measure acceleration in any one of the three above-mentioned directions such as in the lateral direction. Alternatively, the accelerometer may be a bi-axial or a tri-axial accelerometer for measuring acceleration in two or three of the above-mentioned directions or two or three uni-axial accelerometers may be combined to provide measurements. In addition, accelerometers may be oriented in the XLM to measure centripetal, centrifugal, radial, tangential acceleration or acceleration in any other direction. The XLM generates an input signal to MCM 106 when measured acceleration exceeds a predetermined threshold. Similarly, the XLM may be configured to monitor and record both the day-to-day driving performance as well as capture the crash pulse. Advantageously, base station 102 and/or MCM 106 is configured to filter out or compensate for gravitational effects on longitudinal, lateral and vertical acceleration measurements when vehicle 101 is moving on hilly terrain.

As was earlier noted, in one embodiment, the vehicle monitoring system includes a GPS receiver in each vehicle in the fleet and which is configured to track in at least one of real-time or over-time modes the location and directional movement of vehicle 101. As is well known in the art, signals from at least three GPS satellites must be received by a GPS receiver in order to calculate the latitude and longitude of an asset, such as vehicle 101, as well as allowing for tracking of vehicle movement by inferring speed and direction from positional changes. Signals from a fourth GPS satellite allow for calculating the elevation and, hence, vertical movement, of vehicle 101. The GPS receiver provides a GPS signal to MCM 106 which may also be transmitted to the server at the base station for recording into the DCS.

In other embodiments, the vehicle monitoring system may further include a mobile data terminal (MDT), which may be conveniently mounted for observation and manipulation by the driver such as near the vehicle dash. The MDT preferably has an operator interface such as a keypad, keyboard, touch screen, display screen or any suitable user input device and may further include audio input capability such as a microphone to allow voice communications. Importantly, the MDT may include at least one warning mechanism, such as an external speaker and/or a warning light for warning the driver of violation of posted speed limits and/or exceeding acceleration thresholds in lateral, longitudinal and vertical directions as an indication of hard turns, hard braking or hard vertical, respectively. In addition, the MDT may include a manual RF disable switch to prevent RF emissions by the vehicle monitoring system in areas that are sensitive to RF energy.

As was earlier mentioned, MCM 106 is adapted to receive input signals from the OBD or CAN, GPS receiver, CDR, MDT and XLM and, in this regard, may be hardwired such as to the OBD and XLM. Alternatively, because of the small distances between the components installed in the vehicle, short range wireless methods, such as infrared, ultrasonic, Bluetooth, and other mediums, may link such components. Regardless of the manner of interconnection (wireless or hardwired), MCM 106 is operative to transmit to base station 102 an output signal representative of the measured parameters provided by each component according to a rule set or logic contained within MCM 106.

Alternatively, the logic may be entirely contained in database 111 at the server or base station 102 such that all processing is performed at base station 102 and the appropriate signals transmitted back to MCM 106. In the latter scheme, MCM 106 and base station 102 must preferably be in continuous two-way wireless communication which, at the time of this writing, is typically not cost-effective for most fleet operators. Therefore, wireless communication between MCM 106 and base station 102 is based on a protocol of information criticality, cost and system availability.

For example, in emergency situations wherein base station 102 receives a signal from MCM 106 associated with critical data such as an emergency, signal transmission is by the most expedient and reliable means available with cost being a secondary or tertiary consideration. On the other hand, for non-critical data such as an indication of low tire pressure as provided to MCM 106 by the OBD, notification is transmitted to base station 102 by the least expensive means and during a latent transmission.

Wireless communication between MCM 106 and base station 102 may be provided by a variety of systems including, but not limited to, WiFi, cellular network, satellite, Bluetooth, infrared, ultrasound, short wave, microwave or any other suitable method. Hardwired communication may be effected at close range such as when vehicle 101 is within a service yard or at base station 102 wherein an Ethernet connection may be available.

In one embodiment, the DCS is an asset information network that is accessible through at least one server portal and is configured to receive data from MCM 106 during predetermined time intervals, on demand, during critical events, or randomly. The DCS may also be configured to generate reports such as graphic reports (e.g., bar charts) of driver performance. The DCS can also be configured to cause MCM 106 to transmit warning signals to vehicle 101 during driver violations such as speeding, hard turns, hard brake, hard vertical, seatbelt violation and can also be configured to send a notification to the server or base station 102 during predetermined events such as panic, man down, exception, accident, unauthorized vehicle movement to alert fleet management or safety personnel.

The vehicle monitoring system is configured to monitor driver speed using OBD data such as speedometer, odometer, tachometer data or speed inferred from GPS data. Speeding violations may be determined by comparing vehicle speed (as provided by the OBD or as inferred from GPS data) to a speed-by-street database such as a generic third-party data set similar to that commercially available from NAVTEQ of Chicago, Ill., and generate a driver violation when the vehicle speed exceeds the speed-by-street. The driver violation causes MCM 106 to generate an audible/visual warning to the driver in order to change driver behavior over time. In this manner, the vehicle monitoring system provides for mentoring of driver behavior in order to improve safety and reduce fleet management costs.

Furthermore, MCM 106 may be configured to determine vehicle speed such as during a turn where vehicle 101 is moving slower than the speed limit but the lateral acceleration levels as measured by the XLM exceed the threshold values. Such a situation may occur when the driver is turning aggressively in a parking lot (i.e., hard turning). By integrating lateral acceleration over time, it is possible to determine instantaneous velocity of vehicle 101 at any point in the turn. Importantly, in one aspect of the invention, the generation of the warning signal to the driver starts a count-down timer wherein the vehicle monitoring system transmits an exception signal to the base station when the timer duration expires.

Alternatively, an exception signal may be generated when certain measured parameters exceed a threshold value by a large margin, such as when the magnitude of the speeding violation exceeds a threshold of 100 mph. An exception signal may then be transmitted to base station 102 such that appropriate fleet management personnel may be alerted. Such notification may be by any predetermined means and may include cell phone voice or text communication, paging, etc. In addition to the warning signal at vehicle 101, the driver may likewise be contacted by cell phone, page or other radio communications regarding the exception event.

MCM 106 may be in receipt of numerous other sensors that may provide indication of driver violations. For example, in one embodiment, the vehicle monitoring system may include a seat sensor in communication with MCM 106 and which is operative to generate a signal when vehicle 101 is moving and seatbelts of vehicle occupants are unfastened. In this regard, the vehicle monitoring system may include any number of mechanical and electronic sensors in data communication with MCM 106 and which are configured to monitor at least one of the following vehicle parameters: low battery, engine temperature, ignition on/off, headlight turn indicator usage, ABS operability, trailer electrical/mechanical malfunction, proximity forward (tailgating) and proximity rearward (objects behind) and proximity sideways (swerving and lane departures). Furthermore, mechanical and electronic sensors may be provided to monitor at least one of the following driver parameters: blink rate (a sleep or fatigue sensor), heart rate, blood pressure and any other physiological parameters.

The vehicle monitoring system may be operative to track and generate on-demand reports of hours-of-service (HOS) (e.g., on-duty/off-duty driving times, consecutive driving days) in compliance with Federal Motor Carrier Safety Administration regulations. The vehicle monitoring system may additionally be operative to facilitate apportionment of mileage tax by tracking vehicle mileage within a given geographic region by noting state and national border crossings. In another aspect of the invention, it is contemplated that correction for mileage errors can be compensated for by re-synchronizing MCM 106. For example, OBD mileage may drift due to odometer error as a result of tire wear or variations in tire pressure. OBD mileage may also drift due to inconsistencies in GPS receiver data, which may result from multi-path signal errors due to interference with trees and buildings or signal delay errors caused by atmospheric interference. The present invention may include a process for re-synchronizing MCM 106 during vehicle refueling. In this manner, fuel tax may be accurately tracked in order to reduce fleet fuel costs.

MCM 106 may automatically send certain types of signals to base station 102. For example, the vehicle monitoring system may further include a manually/automatically-activatable timer that is configured to generate a man down signal that is sent to base station 102 when the timer duration is exceeded. For example, in remote job site locations such as at an oil well location where it is necessary for the driver to perform certain hazardous tasks outside of the vehicle, the driver may first activate a one-hour (or other duration) timer such that failure to deactivate the timer results in a man down signal being transmitted to base station 102 so that help may be sent to the vehicle location. A similar message may be sent to base station 102 via a panic button activated by a driver, occupant or any nearby person and may operate similar to that of a fire alarm or emergency 9-1-1 phone call wherein fleet management may send help to the vehicle location.

As was earlier mentioned, MCM 106 may be configured to send to base station 102 an exception signal representative of a violation of one of a plurality of parameters comprising at least one of exceeding a predetermined speed along a given route, failure to wear seatbelt, failure to activate headlights, tailgating, excessive idle time, excessive engine RPM, engine parameters, tire condition, vehicle load condition, vehicle location violation. The parameter settings (i.e., logic) of MCM 106 may be remotely changed by commands transmitted from base station 102 to MCM 106. More specifically, the rule sets that comprise the hierarchy (i.e., criticality) by which signals are transmitted from MCM 106 to base station 102 may be revised. For example, a hierarchy of signal transmission may be revised from: panic, man down, crash event, exception, non-urgent communication to a hierarchy of crash event, man down, panic, exception, non-urgent communication.

In this same regard, MCM 106 in one aspect of the invention is configured to allow for wireless or remote manipulation from base station 102 of vehicle settings through the OBD or CAN and may allow for revising certain vehicle settings such as engine governor setting and ignition timing. In a further aspect, the vehicle monitoring system allows for generating reports or alerts (e.g., text and/or map) of recently-occurring accident locations and dangerous road conditions such that a warning signal may be provided to the driver when vehicle 101 approaches the accident location or road condition. Additionally, the system can be configured to geo-fence certain areas of interest and to notify specified and/or targeted individuals when vehicle 101 and its driver approaches or departs a geo-fenced area. As was earlier mentioned, the database is configured to collect driver performance data over time, generate a driver performance database comprising vehicle type and driver profile, and generate reports of predictive driver behavior based on historical driver performance data with the option of generating a graphical representation such as a bar chart of driver performance.

Additional modifications and improvements of the present invention may also be apparent to those of ordinary skill in the art. Thus, the particular combination of parts described and illustrated herein is intended to represent only one embodiment of the present invention and is not intended to serve as limitations of alternative devices within the spirit and scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for modifying the operation of an engine, comprising:
    an engine control unit coupled to the engine;
    a geolocation device;
    a command module coupled to the engine control unit; and
    one or more accelerometers coupled to the command module;
    wherein the command module is operable to modify operating characteristics of the engine using the engine control unit based upon a location of the vehicle determined using the geolocation device;
    wherein the command module reconfigures the function of the engine control unit based upon data from the one or more accelerometers.

2. A system for modifying the operation of an engine, comprising:
    an engine control unit coupled to the engine;
    a geolocation device;
    a command module coupled to the engine control unit; and
    wherein the command module is operable to modify operating characteristics of the engine using the engine control unit based upon a location of the vehicle determined using the geolocation device;
    wherein the function of the engine control unit is adapted to be reconfigured by a tuning chip that replaces an existing erasable programmable, read-only memory (EPROM) chip.

3. A method for controlling the operation of an engine, comprising:
    determining a location of a vehicle;
    receiving an engine operation command at a command module in a vehicle, the engine operation command based on the determined location of the vehicle, and
    reconfiguring an engine control device of the vehicle in response to the engine operation command;
    wherein the engine control device is adapted to be reconfigured by a tuning chip that replaces an existing erasable programmable, read-only memory (EPROM) chip.

4. A method for controlling the operation of an engine, comprising:
    receiving, at a command module, vehicle operation data from a vehicle monitoring system in a vehicle, the vehicle monitoring system including two or more accelerometers; and
    reconfiguring an engine control device in response to the vehicle operation data, the vehicle operation data including data from one or more accelerometers.

5. The method of claim 4, wherein the engine operation is modified to maximize fuel economy.

6. The method of claim 4, further comprising:
    reconfiguring a function of the engine control device based upon data from an on-board diagnostic system for the vehicle.

7. The method of claim 6, wherein the command module reconfigures the function of the engine control device via the on-board diagnostic system.

8. A system for modifying the operation of an engine, comprising:
    an engine control unit coupled to the engine;
    a geolocation device;
    a command module coupled to the engine control unit; and
    wherein the command module is operable to modify operating characteristics of the engine using the engine control unit based upon a location of the vehicle determined using the geolocation device.

9. The system of claim 1, wherein the engine control unit further comprises software; and wherein the command module reconfigures the function of the engine control unit by altering the software.

10. The system of claim 1, wherein the engine control unit further comprises firmware; and wherein the command module reconfigures the function of the engine control unit by altering the firmware.

11. The system of claim 1, wherein the command module modifies the engine operation based upon environmental conditions.

12. The system of claim 1, wherein the command module modifies the engine operation based upon topographic conditions.

13. The system of claim 1, wherein the command module modifies the engine operation based upon traffic conditions.

14. The system of claim 1, wherein the engine operation is modified to maximize fuel economy.

15. The system of claim 1, further comprising:
a remote base station in communication with the command module; and
wherein the command module is adapted to receive engine configuration commands transmitted from the remote base station.

16. The system of claim 1, further comprising:
an on-board diagnostic system for the engine coupled to the command module.

17. The system of claim 16, wherein the command module receives vehicle performance data from the on-board diagnostic system; and
wherein the command module reconfigures the function of the engine control unit based upon data from the on-board diagnostic system.

18. The system of claim 16, wherein the command module reconfigures the function of the engine control unit via the on-board diagnostic system or other conduit to an engine control module.

19. A method for controlling the operation of an engine, comprising:
determining a location of a vehicle;
receiving an engine operation command at a command module in a the vehicle, the engine operation command based on the determined location of the vehicle; and
reconfiguring an engine control device of the vehicle in response to the engine operation command.

20. The method of claim 19, wherein the command module receives the engine operation command via a wireless link to a base station.

21. The method of claim 19, further comprising:
reconfiguring a function of the engine control device by altering software in the engine control device.

22. The method of claim 19, further comprising:
reconfiguring a function of the engine control device by altering firmware in the engine control device.

23. The method of claim 19, wherein the reconfiguring modifies an engine operation based upon environmental conditions.

24. The method of claim 19, wherein the reconfiguring modifies an engine operation based upon topographic conditions.

25. The method of claim 19, wherein the reconfiguring modifies an engine operation based upon traffic conditions.

26. The method of claim 19, wherein the command module is coupled to the engine control device via an on-board diagnostic system for the vehicle.

27. The method of claim 26, wherein the command module reconfigures a function of the engine control device via the on-board diagnostic system.

* * * * *